United States Patent [19]
Bushell et al.

[11] Patent Number: 6,011,493
[45] Date of Patent: *Jan. 4, 2000

[54] AIRCRAFT LIGHTING SYSTEM

[75] Inventors: Timothy G. Bushell, Lindal-In-Furness; Phillip Logan, Swarthmoor; Geoffrey S. Edwards, Allithwaite, all of United Kingdom

[73] Assignee: Oxley Developments Company, Ltd., Cumbria, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/628,011

[22] Filed: Apr. 4, 1996

[30] Foreign Application Priority Data

Apr. 5, 1995 [GB] United Kingdom .................. 9507060
Feb. 16, 1996 [GB] United Kingdom .................. 9603350

[51] Int. Cl.[7] .................................................. B64D 47/06
[52] U.S. Cl. ............................................ 340/981; 362/62
[58] Field of Search ........................ 340/981, 982, 340/983, 947, 952, 953, 945; 362/62

[56] References Cited

U.S. PATENT DOCUMENTS

| | | | |
|---|---|---|---|
| 3,978,342 | 8/1976 | Hagen et al. | 250/495 |
| 4,011,541 | 3/1977 | Fabry et al. | 340/331 |
| 4,495,549 | 1/1985 | Carlson et al. | 362/62 |
| 4,554,544 | 11/1985 | Task | 340/953 |
| 4,580,196 | 4/1986 | Task | 362/62 |
| 4,951,046 | 8/1990 | Lambert et al. | 340/947 |
| 5,031,080 | 7/1991 | Aikens et al. | 362/62 |
| 5,225,828 | 7/1993 | Walleston | 340/953 |
| 5,243,340 | 9/1993 | Norman et al. | 340/953 |
| 5,293,304 | 3/1994 | Godfrey | 340/981 |
| 5,587,784 | 12/1996 | Pines et al. | 356/4.01 |

FOREIGN PATENT DOCUMENTS 0051325 5/1982 European Pat. Off. .
0091715 10/1983 European Pat. Off. .

*Primary Examiner*—Brent A. Swarthout
*Attorney, Agent, or Firm*—Townsend and Townsend and Crew LLP

[57] ABSTRACT

An aircraft lighting system is disclosed in which conventional visible light sources at the exterior of an aircraft are provided with optical filters which block infra red light. In this way, it is made possible to use visible external lighting (required by Civil Aviation Authority regulations) during training exercises involving infra red sensitive night vision goggles, which would otherwise be dazzled by the infra red output of the visible lighting. Also disclosed are means of selectively controlling both visible and I.R. light sources using a single existing cable.

13 Claims, 4 Drawing Sheets

AIRCRAFT LIGHTING SYSTEM

BACKGROUND OF THE INVENTION

The present invention relates to external aircraft lighting systems, and in particular to such systems for use with night vision goggles.

Night vision goggles (NVGs) are used in military aircraft. By detecting ambient infra red light ("infra red light" should be understood to include near infra red light throughout this document) and interpreting this to produce a display visible to the pilot, NVGs considerably enhance a pilot's ability to "see" in the dark. One of the many advantages thus made possible is that external aircraft lighting in the visible spectrum becomes (in certain contexts) unnecessary, and military aircraft can thus be operated in a covert mode in which no such external lighting is provided, making the aircraft harder to detect. By providing low intensity external infra red lighting, it can be ensured that aircraft remain visible to each other, e.g for collision avoidance, formation flying, location and orientation, while still providing no illumination visible to the naked eye.

Several problems arise in providing the type of external aircraft lighting needed to best utilize night vision systems.

Perhaps the most significant of these problems arises during training. Regulations imposed, for example, by the Civil and Federal Aviation Authorities require aircraft in Civil airspace to carry visible external lighting. Thus, even during training in the use of night vision goggles, this visible lighting must be provided. Unfortunately, conventional lights (using filament bulbs) emit strongly in the IR part of the spectrum and thus can dazzle and effectively incapacitate NVGs, making training difficult or impossible.

In addition, many existing aircraft are not equipped with external infra red lighting, and a retrofit lighting system is therefore needed. Difficulty arises because wiring of the lighting must extend from the cockpit to extremities of the aircraft including wingtips and tail. The cost of adding fresh sets of wiring to provide for signals to two sets of lights (visible and IR) instead of the conventional single set of visible lights is considerable, since it requires disassembly of numerous parts of the aircraft to provide access to the routes taken by the wiring.

Solutions to both of the above described problems are objects of the present invention.

SUMMARY OF THE INVENTION

In accordance with a first aspect of the present invention, there is provided an external lighting assembly for an aircraft, comprising a source of visible light, characterized by a filter which allows visible light to be transmitted by said lighting assembly but substantially reduces emission of selected infra red frequencies.

Preferably said source of visible light is mounted in a housing having a window through which visible light is emitted by said visible light source, said filter being disposed in said housing between the visible light source and said window such that visible light from said visible light source can only reach said window via said filter.

Preferably, said filter is an interference type filter which selectively reflects the infra red frequencies.

Preferably, said lighting assembly further comprises electrically powered infra red emitting means. Said infra red emitting means may take the form of one or more infra red diodes disposed externally on said housing.

In such a lighting assembly, selected infra red frequencies can be blocked by the filter and thus removed from the output of the visible light source.

By removing or substantially removing infra red frequencies to which the night vision system is sensitive, the visible light source can be made to appear dimmer to the night vision system (thereby preventing the NVG from being dazzled) or can even be made substantially invisible to the night vision system, while still giving the visible signal (that is, visible to the naked eye) required by regulations. Thus, training in the use of night vision systems in civil airspace is made possible by the present invention.

The additional infra red emitter can be used to provide a relatively low intensity XP signal to others using night vision systems (to enable formation flying etc) without producing visible light.

Preferably, the lighting assembly is provided with voltage sensing means adapted to monitor a supply voltage to said visible light source and to connect said supply voltage to the infra-red emitting means when said supply voltage is less than a predetermined threshold.

In this way, the single wire conventionally used to drive the source of visible light (earth being provided by the airframe itself) can be used to selectively energize the visible or infra red light sources, as will be explained below.

In accordance with a second aspect of the present invention, the external lighting assembly in accordance with the first aspect is incorporated in a lighting system for an aircraft which further comprises at least one current supply cable mounted in the aircraft fuselage/wings, a coder at a cockpit end of said cable for coding power signals applied to that cable, and decoding means at an opposite, remote end of said cable for selectively energizing the infra red emitting means and/or the visible light source.

In a particularly preferred embodiment, the coder enables a range of voltage levels to be selectively applied to said current supply cable and the decoder includes a voltage sensing means which is adapted to selectively couple the visible light source and/or the infra red emitting means to the current supply depending on the voltage level detected.

Preferably, the decoder is adapted to connect the infra red emitting means to the current supply only when the voltage level detected lies below a predetermined threshold In an alternative embodiment, the coder is adapted to enable a voltage source to be connected selectively to said current supply cable in either of a forward (+) polarity or a reverse (−) polarity, the decoder comprising two diodes connected respectively to the visible light source and the infra red emitting means with opposite orientations, whereby one diode is conductive to the forward polarity supply to energize the visible light source and the other diode is conductive to the reverse polarity supply to energize the infra red emitting means.

In a further preferred embodiment, the coder is adapted to apply to said current supply cable a coded digital signal and the decoder is adapted to decode the latter signal and selectively connect the visible light source and/or the infra red emitting means to the current supply cable in dependence upon the coded signal.

In accordance with a third aspect of the present invention, there is provided a filter unit adapted to be fitted to an external aircraft lighting assembly having a source of visible light disposed within a housing and a housing window through which visible light is emitted, the filter unit comprising a filter for removal or substantial removal of selected infra red frequencies from the radiation emitted by said source of visible light, said filter unit being adapted to partition said housing of the aircraft lighting assembly such as to thereby separate said source of visible light within the housing from said housing window.

In this way, existing light assemblies can be adapted for the above described compatibility with night vision systems.

In a preferred embodiment, the housing is provided with windows which are covered by filter elements.

In accordance with a fourth aspect of the present invention, there is provided an aircraft lighting system comprising a visible light source and an electrically driven infra red emitter, both of which are mounted at the exterior of an aircraft, variable voltage supply means, a conductor via which the voltage supply means is connected to the visible light source, and control means sensitive to the voltage from the voltage supply means, the control means being adapted to apply a drive voltage to the infra red emitter only when the voltage from the voltage supply means is below a predetermined threshold.

Using such a system, a single wire can be used to selectively switch on either the IR emitter or the visible light source.

Preferably, the voltage supply means is connected to a cockpit end of the conductor and the control means is disposed in the vicinity of the infra red emitter.

Specific embodiments of the present invention will now be described, by way of example only, with reference to the accompanying Figures in which;

DETAILED DESCRIPTION OF THE SPECIFIC EMBODIMENTS

Figure 1:
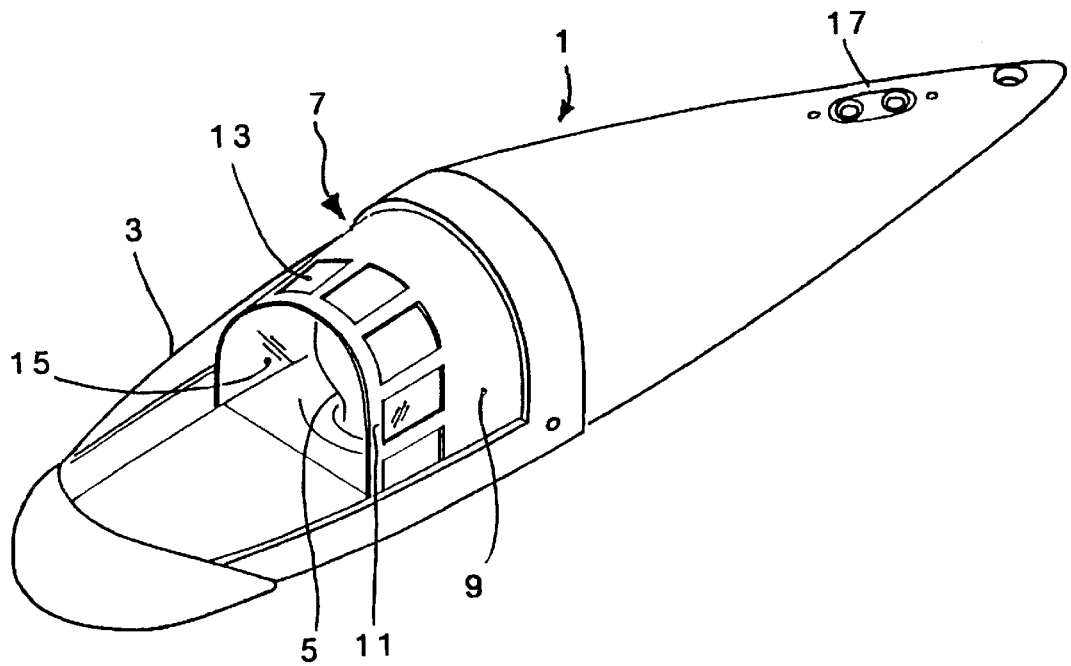
FIG. 1 is a perspective illustration of a navigation light in accordance with the present invention intended to be mounted at an air intake of a jet fighter aircraft.

The light illustrated in FIG. 1 comprises a substantially conventional tear drop shaped fairing 1 with a shaped, tinted forward window 3 within which is disposed a conventional light bulb 5. Such lights are in use in existing aircraft.

In accordance with one aspect of the present invention, the light has been modified by insertion of a filter 7 within the forward window.

The filter 7 comprise an arched, opaque cage 9 which is placed around the bulb 5. The cage 9 is penetrated by several apertures 11 which are covered by filter elements 13, and the front of the cage (which would otherwise be open) is covered by an arch shaped filter element 15. This construction permits the use of conventional, flat, filter elements 13,15.

The filter elements 13 and 15, while at least substantially transparent to visible light, are at least substantially opaque to the IR wavelengths detected by NVGs, so that little or no light at these wavelengths produced by the bulb 5 is emitted by the light.

The filter elements must be heat resistant, to withstand heat from the incandescent bulb, and are (according to the present embodiment) in the form of interference type glass filters which selectively reflect infra red, preventing heat damage.

However, the light has been provided with an infra red emitter 17 (eg an infra red emitting diode) at a rear portion thereof. "Infra red emitters", in the present context, implies a device which can be driven to emit infra red or near infra red light while generating little or no visible light Two modes of operation are made possible by the modified light. Where appropriate (eg during training exercises, when visible external light is required) the bulb 5 is illuminated.

Because infra red light detectable by NVGs is not emitted or is emitted at only very low intensity, the modified lights cannot dazzle NVGs.

In fact, where a small amount of I.R. light is allowed to escape from the visible light source, this can be used to effectively mimic the appearance (to NVGs) of the I.R. lighting used in covert operations, which is useful for training exercises.

Of course, the modified light retains, in visible mode, all the facilities of standard lighting such as flashing and dimming.

During covert operations, the bulb 5 is turned off, the IR emitter 17 is (if desired) turned on, and the light becomes visible only to those wearing NVGs.

Where a light of the above described type is fitted to an existing aircraft, only a single electrical supply line (for supply/control of a single type of light—a visible light) is normally provided.

Figure 7:
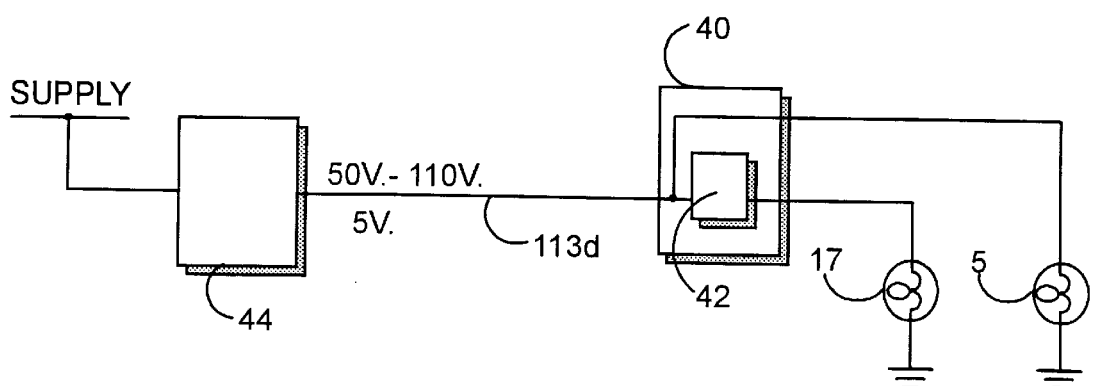
FIGS. 4, 5, 6 and 7 show specific circuits in accordance with the present invention and applicable to the generalized format of FIG. 3.

To provide for control of both visible and infra red light sources, the present exemplary embodiment can incorporate a voltage sensitive "sniffer" circuit 40 (see FIG. 7). While the bulb 5 is connected directly to the single supply line 113d, the IR emitter 17 is connectable to the supply line 113d via detection circuitry 42 within the sniffer circuit 40.

The sniffer circuit 40 operates as a voltage sensitive switch which opens (and so applies a voltage across the IR emitter 17) only when the applied supply voltage on the supply line 113d lies below a predetermined level of approximately 5 volts.

Now, the bulb 5 is designed to operate at between 50 v (dim mode) and 110 v (bright mode). When the bulb 5 is lit by a voltage in this range, the detection circuitry 42 in the sniffer circuit 40 turns the IR emitter 17 off.

If the voltage at the supply line is reduced to 5 V via supply control circuitry 44, however, not only is the IR emitter 17 switched on by the detection circuitry 42 in the sniffer circuit 40, but in addition the bulb 5 is naturally dimmed so that it produces little or no visible light, any residual infra red or near infra red light emitted being blocked by the filter 7.

The detection circuitry 42 in the sniffer circuit 40 can be straightforwardly achieved using transistor/zener diode devices.

The control electronics 44 provided at the cockpit end of the supply line can selectively set the supply voltage at either 5 volts or 50–110 volts and so to switch between IR (covert) lighting only and visible lighting only.

Figure 2B:
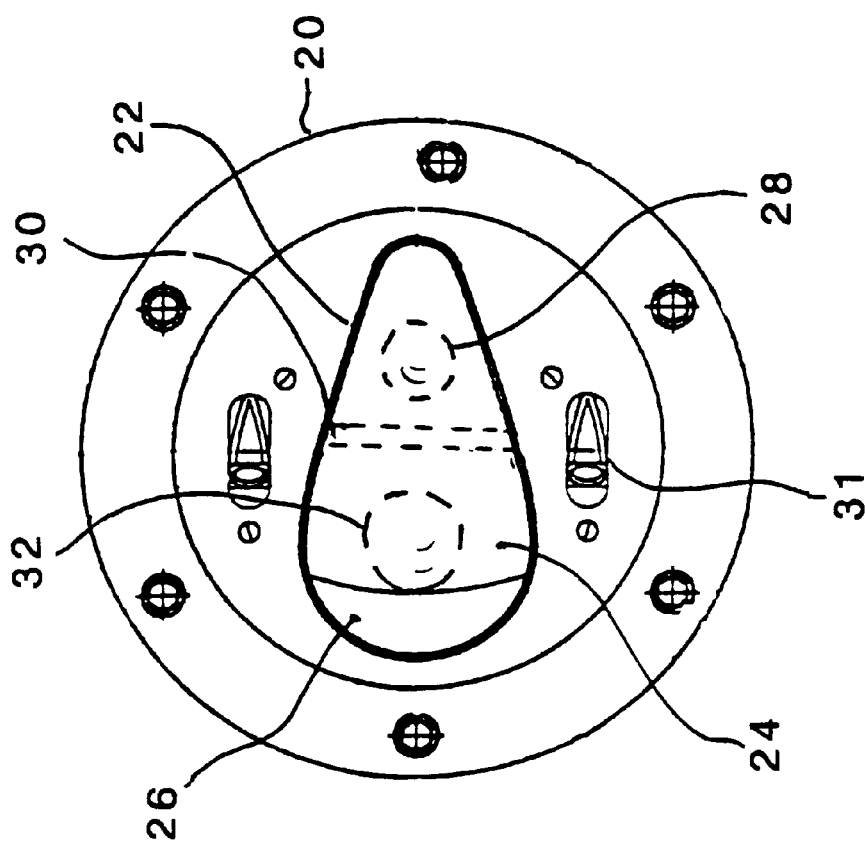
FIGS. 2a and 2b are, respectively, side and plan views of a formation light in accordance with the present invention intended to be mounted on the upper fuselage of such an aircraft.
Figure 2A:
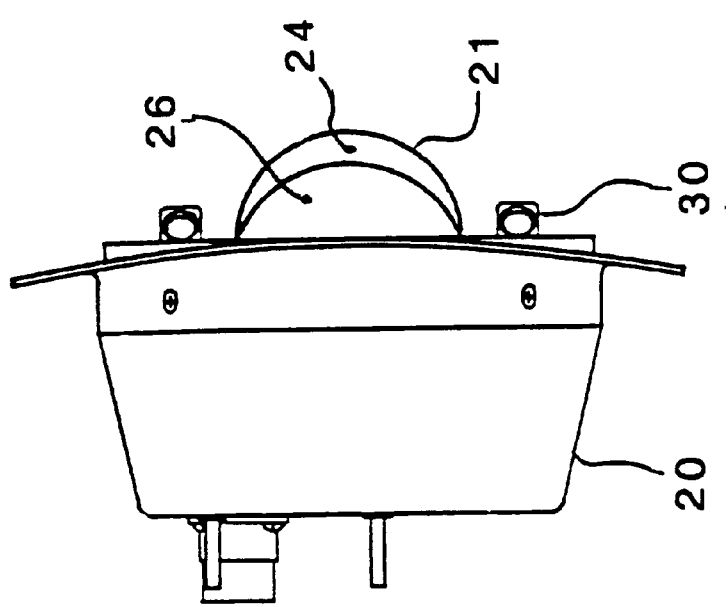

FIG. 2 shows a further light—in this case a formation light for mounting at the upper surface of a fuselage—modified in accordance with the present invention.

The formation light is based on a circular housing 20 on the outer surface of which is disposed a tear drop shaped fairing 22, having an opaque rear portion 24 and a transparent forward window 26. Components within the housing are shown in dotted lines and comprise a main bulb 28, a filter partition 30 and a re-fuelling bulb 32.

The re-fuelling bulb 32 is used only during refuelling under visible lighting and is of no interest for present purposes. The main bulb 28 is used in normal flight to provide visible lighting, its light emission being filtered (to remove IR frequencies, as in the previously described embodiment) by the filter partition 30 before escaping through the forward window 26.

The filter partition 30 can be retrofitted to an existing light.

Two infra red emitters 31 are provided on the housing 20 for use in covert flying, and visible and IR lighting can be switched as in the previously described embodiment.

While the above described method of controlling the visible/I.R. lighting assembly (using a variable supply voltage and a sniffer circuit) is particularly advantageous, other methods can be used, without departing from the scope of the invention, to control the two light sources using existing wiring. This aspect of the present invention will now be considered in more detail, with reference to FIGS. 3 to 6.

Figure 3:
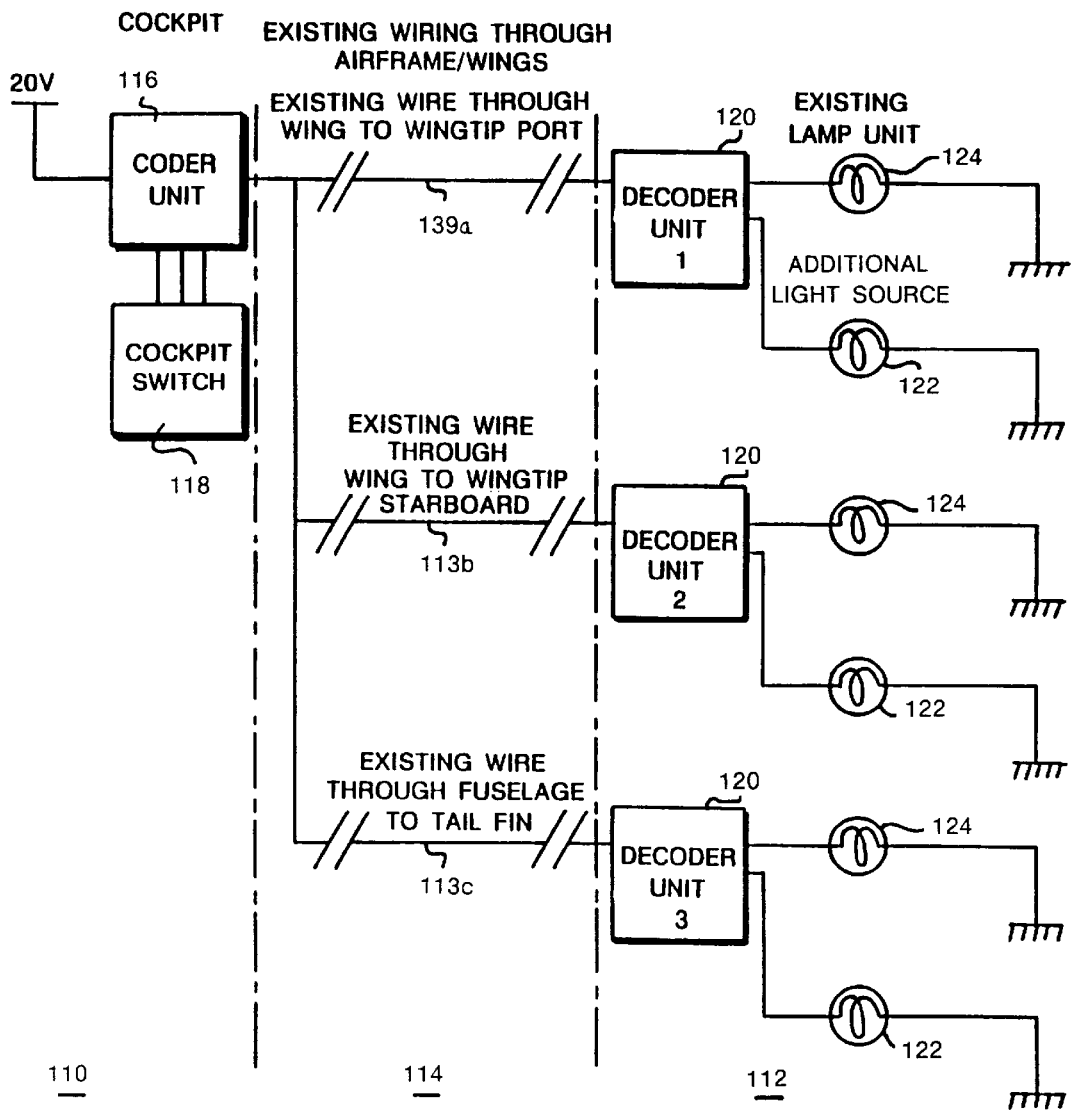
FIG. 3 illustrates in a simplified generalized format a modified aircraft wiring system in accordance with the present invention.

Referring to FIG. 3, there is shown a generalized view of a modified aircraft wiring system in accordance with the present invention The system can be considered to comprise three distinct sections, namely a cockpit section lo, a wing tips and/or tail fin section 112, both of which are relatively easily accessible and modifiable, and a section 114 consisting of existing wiring 113 which runs through the aircraft fuselage/wings between sections 110 and 112. It is desirable to avoid modification of the existing wiring in section 114, since this requires extensive disassembly of the aircraft.

For this latter purpose, the system of FIG. 3 includes in the cockpit section 110 a coder unit 116 controlled by a cockpit switch 118 preferably positioned near to the cockpit lighting switch, and in the wing tips/tail fin section 112 one or more corresponding decoders 120, and also a visible light source 124 and an I.R. light source 122. The coder/decoder system can power and selectively activate the two exterior lights (visible/I.R.) using only one existing power wire. If necessary, further lights could even be controlled.

FIG. 3 shows by way of example three sets of existing wiring 113a, 113b, 113c comprising respectively the existing wiring through the wing to the port tip, the existing wiring through the wing to the starboard wing tip and the existing wiring through the fuselage to the tail fin.

Figure 4:
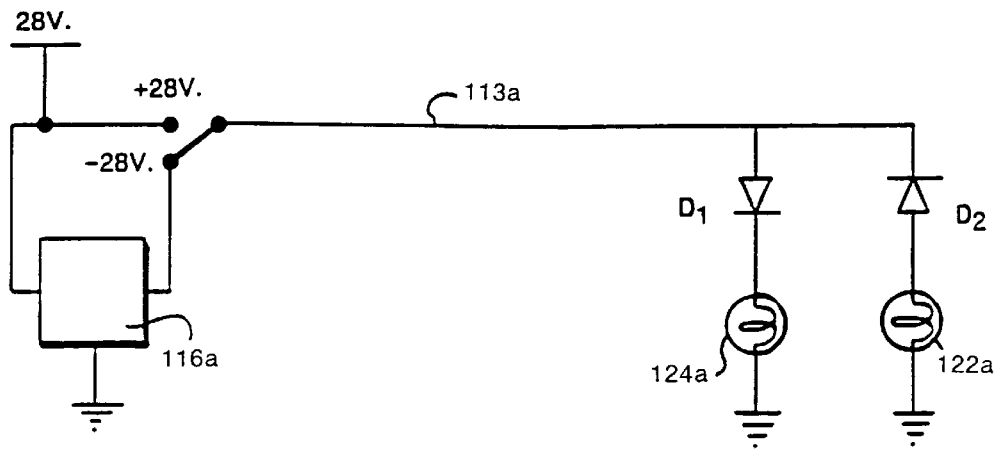
Figure 5:
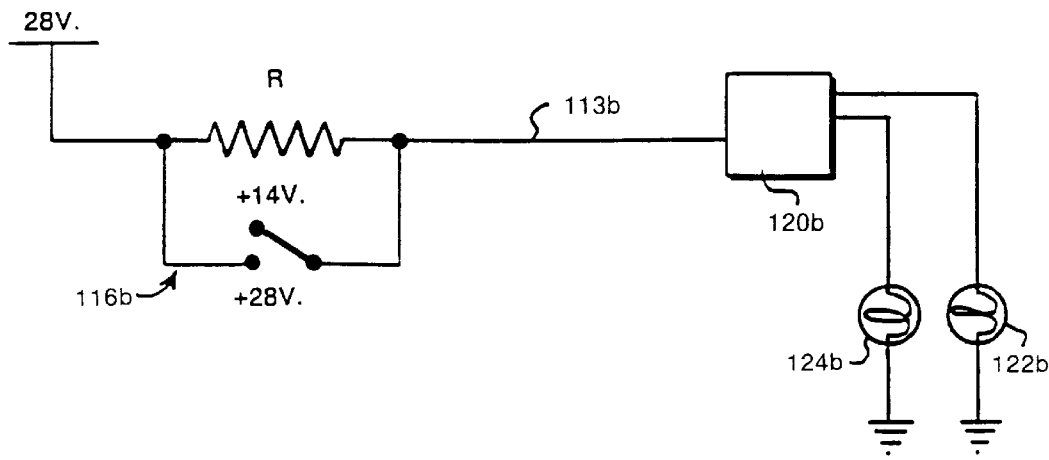
Figure 6:
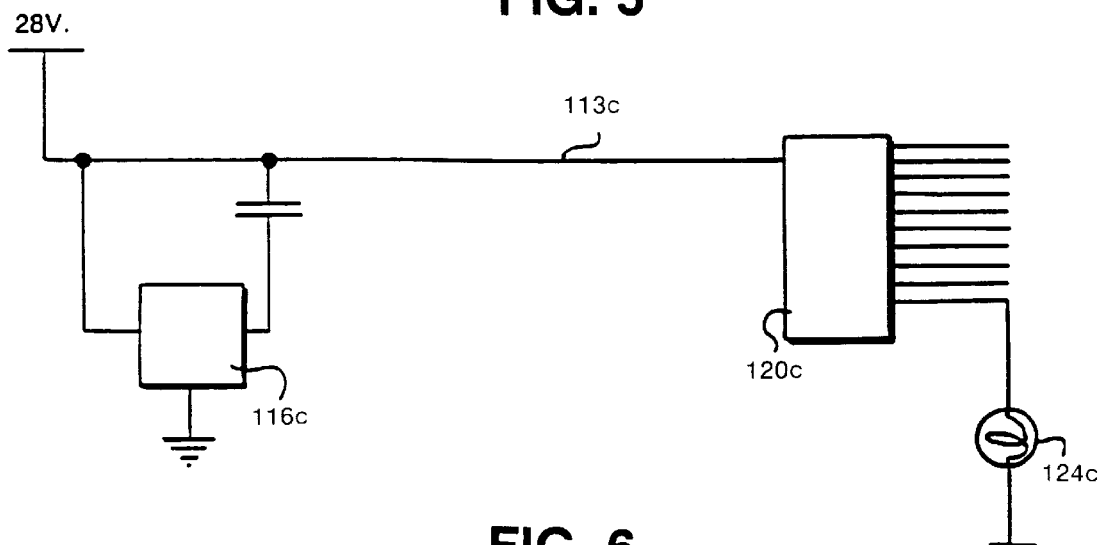

FIGS. 4 to 6 show examples of possible coding means applicable to the generalized system of FIG. 3. In the system shown in FIG. 4, a first diode D1 is connected in series with the visible light source 124a and a second diode D2 is connected in series with a newly fitted I.R. source 122a. It does not matter which way round the diodes D1,D2 are fitted as long as they are fitted in the opposite directions to each other. The coder at the cockpit end consists in this case of a supply inverter 116a which enables the existing cabling 113a to be supplied either with a positive or negative supply voltage. In this case, if a positive supply is selected, the visible source 124 only will be energized, and if the negative supply is selected, only the I.R. source 122a will be energized.

FIG. 5 shows an example where the detector is a linear voltage detector 120b which responds to the magnitude of the input voltage thereto to select different loads, ie. different light sources 122b, 124b. In this case, the cockpit coder enables different levels of voltage to be selected for application to the existing cabling 113b. In the simple case illustrated, this is achieved by selecting either a direct connection to a +28 v supply or a proportion (in this case 50%) of that supply determined by the value of a switched resistor R. In this case more than two light sources could be controlled by splitting the supply voltage further.

FIG. 6 shows an example where a small digital signal is superimposed on the supply voltage on the existing wiring 113c by means of a digital coder 116 This small digital signal is picked up by a digital decoder 120c in section 112 and can supply any number of additional light sources (not shown) in addition to or in place of the existing visible source 24c.

We claim:

1. An aircraft lighting assembly for providing external in flight lighting, comprising a housing which is adapted to be mounted at the exterior of the aircraft suitable for in flight operation, a light source which is disposed in the housing and which emits both visible and infra red light, and filter means positioned near the light source such as to filter its output, said filter means being such as to allow visible light from said light source to be output from said assembly, wherein the lighting assembly is adapted to provide anti-collision visible external in flight lighting for said aircraft sufficient to comply with lighting regulations when flying in civil air space and while performing training exercises in civil air space while at least substantially reducing emission of selected infra red frequencies such that the output from said lighting assembly does not dazzle infra red sensitive night vision systems in flight.

2. An external aircraft lighting assembly according to claim 1, wherein said housing has a window through which visible light is emitted by said light source, said filter being disposed in said housing between said visible light source and said window such that light from said visible light source can only reach said window via said filter means.

3. An external aircraft lighting assembly according to claim 2, wherein said filter means comprises an interference type filter which selectively reflects infra red radiation.

4. An external aircraft lighting assembly according to claim 2, further comprising electrically powered infra red emitting means disposed externally on said housing.

5. An external aircraft lighting assembly according to claim 4, further comprising voltage sensing means adapted to monitor a supply voltage to said visible light source and to connect said supply voltage to said infra-red emitting means when said supply voltage is less than a predetermined threshold.

6. An aircraft lighting system comprising an external lighting assembly according to claim 4, at least one current supply cable mounted in the aircraft fuselage, a coder means at a cockpit end of said cable for coding power signals applied to that cable, and a decoding means at an opposite, remote end of said cable for selectively energizing at least one of said infra red emitting means and said visible light source.

7. An aircraft lighting system according to claim 6, wherein said coder means is adapted to enable a voltage source to be connected selectively to said current supply cable in one of a forward polarity and a reverse polarity, the decoder comprising two diodes connected respectively to the visible light source and the infra red emitting means with opposite orientations, whereby one diode is conductive to the forward polarity supply to energize the visible light source and the other diode is conductive to the reverse polarity supply to energize the infra red emitting means.

8. An aircraft lighting system according to claim 6, wherein said coder means enables a range of voltage levels to be selectively applied to said current supply cable and the decoder includes a voltage sensing means which is adapted to selectively couple one of said visible light source and said infra red emitting means to the current supply depending on the voltage level detected.

9. An aircraft lighting system according to claim 8, wherein said decoder means is adapted to connect said infra red emitting means to said current supply only when said voltage level detected lies below a predetermined threshold.

10. An aircraft lighting system according to claim 6, wherein said coder means is adapted to apply to said current supply cable a coded digital signal and said decoder means is adapted to decode said latter signal and selectively connect one of said visible light source and said infra red emitting means to the current supply cable in dependence upon the coded signal.

11. An external aircraft lighting assembly according to claim 3 further comprising a cage placed around the light source, the cage being penetrated by apertures which are covered by respective filter elements of interference type.

12. A filter unit adapted to be fitted to an aircraft lighting assembly which is for providing external in flight lighting and which comprises a housing adapted to be mounted at the exterior of the aircraft suitable for in flight operation, a light source disposed in the housing and which emits both visible light and infra red light, and a housing window through which visible light is emitted, said filter unit being adapted to partition said housing of said aircraft lighting assembly such as to thereby separate said source of visible light within said housing from said housing window and comprising filter means which are such as to allow visible light from said light source to be emitted from said lighting assembly such that said assembly can provide anti-collision visible external in flight lighting for the aircraft which is sufficient to comply with lighting regulations when flying in civil air space and while performing training exercises in civil air space while at least substantially reducing emission of selected infra red frequencies such that the output from said lighting assembly does not dazzle infra red sensitive night vision systems in flight.

13. A filter unit according to claim 12 comprising a cage for placement around the light source within the housing, the cage being penetrated by apertures which are covered by respective filter elements of interference type.

\* \* \* \* \*